United States Patent
Nakajima et al.

(10) Patent No.: US 7,843,839 B2
(45) Date of Patent: Nov. 30, 2010

(54) TRANSMISSION DEVICE SERIALLY RESETTING EACH CIRCUIT INCLUDED THEREIN

(75) Inventors: Takashi Nakajima, Kawasaki (JP);
Kazuaki Kobayashi, Kawasaki (JP);
Kazumaro Takaiwa, Kawasaki (JP);
Masahiro Agata, Kawasaki (JP);
Yoshihisa Funami, Kawasaki (JP);
Yuichi Kotaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 907 days.

(21) Appl. No.: 11/451,413

(22) Filed: Jun. 13, 2006

(65) Prior Publication Data

US 2007/0177516 A1     Aug. 2, 2007

(30) Foreign Application Priority Data

Jan. 31, 2006   (JP)   ............................. 2006-022168

(51) Int. Cl.
*G06F 11/00* (2006.01)
*H04B 7/212* (2006.01)

(52) U.S. Cl. ....................... 370/242; 370/216; 370/324; 714/2

(58) Field of Classification Search ......... 370/216–295, 370/395.51, 324; 340/635, 642; 375/295; 714/2–25; 398/6–8
See application file for complete search history.

(56) References Cited

U.S. PATENT DOCUMENTS 3,652,798 A * 3/1972 McNeilly et al. ............. 370/224
5,790,285 A * 8/1998 Mock .......................... 398/21

FOREIGN PATENT DOCUMENTS

JP     06-318107     11/1994

* cited by examiner

*Primary Examiner*—Afsar M. Qureshi
(74) *Attorney, Agent, or Firm*—Fujitsu Patent Center

(57) ABSTRACT

A transmission apparatus includes: a plurality of signal transmission circuits on a transmission path; a monitoring unit that detects a fault by monitoring an operating status of each of the signal transmission circuits; a controlling unit that outputs a reset instruction when the monitoring unit detects the fault; and an individual resetting unit that receives the reset instruction and resets individually each of the signal transmission circuits.

7 Claims, 9 Drawing Sheets

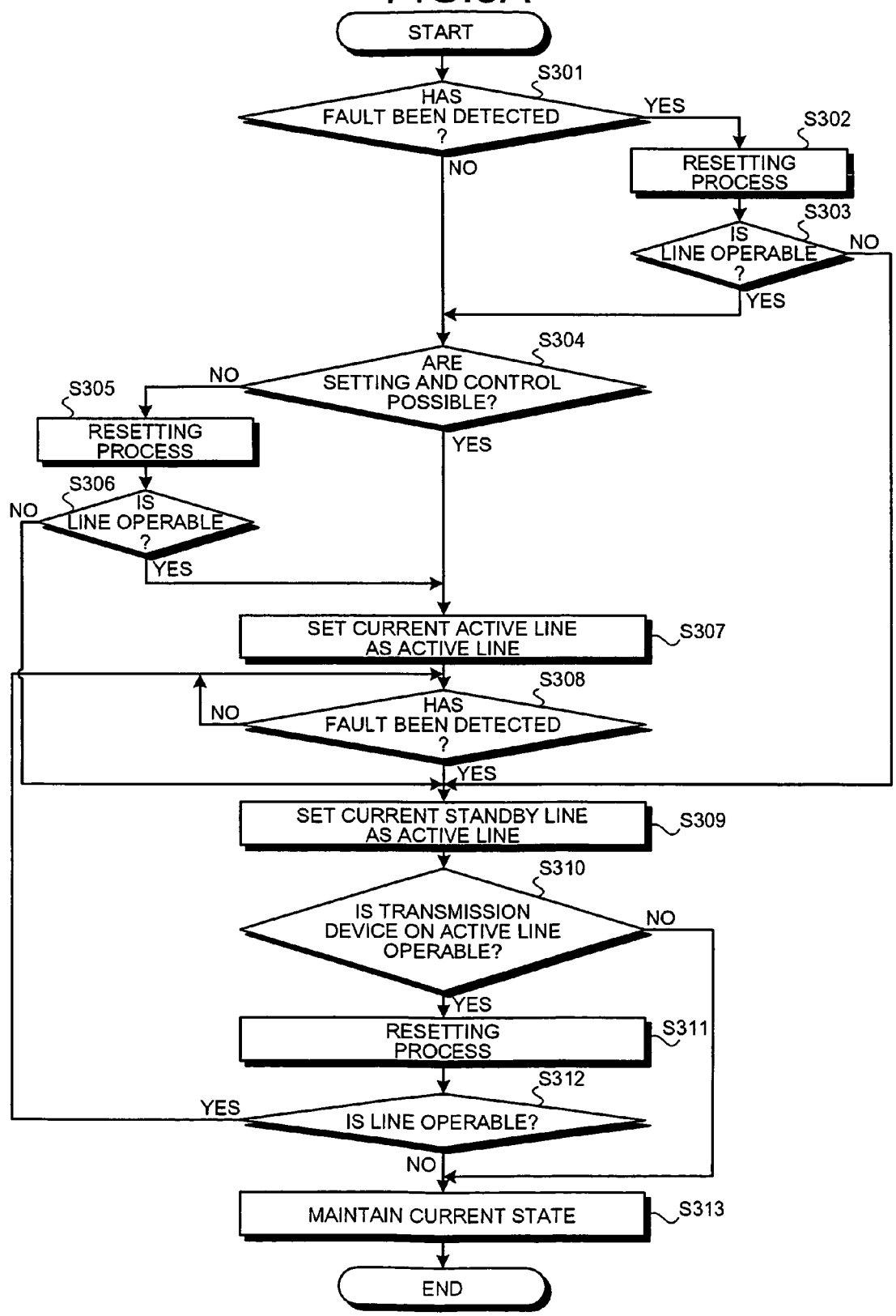

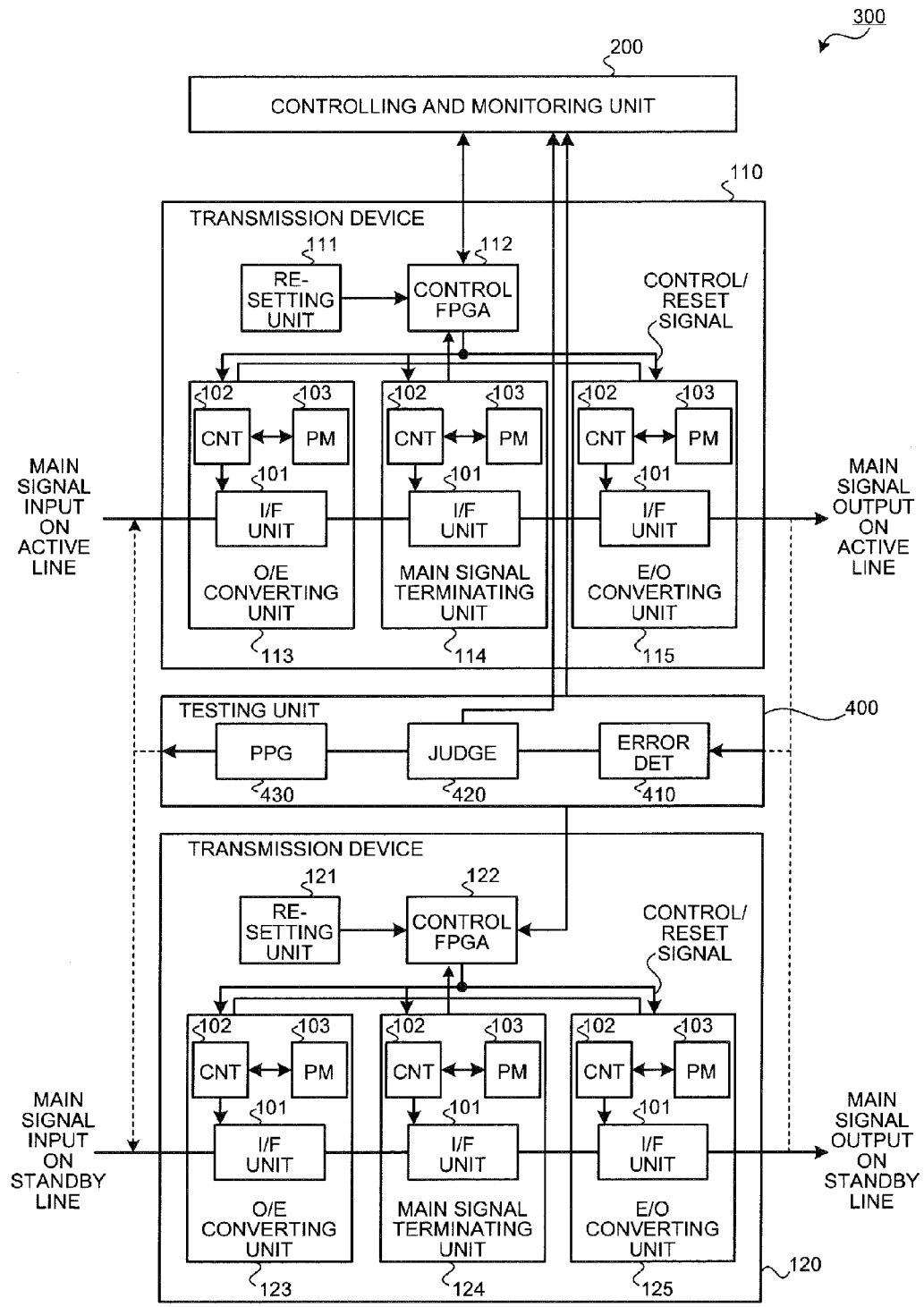

TRANSMISSION DEVICE SERIALLY RESETTING EACH CIRCUIT INCLUDED THEREIN

CROSS-REFERENCE TO RELATED APPLICATIONS

This application is based upon and claims the benefit of priority from the prior Japanese Patent Application No. 2006-022168, filed on Jan. 31, 2006, the entire contents of which are incorporated herein by reference.

BACKGROUND OF THE INVENTION

1. Field of the Invention

The present invention relates to a transmission apparatus that recovers from a fault occurred in a communication line, by automatically diagnosing the fault and by taking recovery measures against the fault.

2. Description of the Related Art

Conventionally, a transmission apparatus on a transmission path is provided with a plurality of transmission devices, and a controlling and monitoring unit that controls operation and monitors operating status of the transmission devices. FIG. 7 is a block diagram of a conventional transmission device and a conventional controlling and monitoring unit. The transmission device 1100 is one of a plurality of transmission devices constituting the conventional transmission apparatus. The transmission device 1100 receives an optical signal from the transmission path, converts the optical signal into an electric signal, converts the electric signal into an optical signal, and transmits the optical signal to the transmission path.

The transmission device 1100 includes a resetting unit 1111, a control FPGA 1112, an O/E converting unit 1113, a main signal terminating unit 1114, and an E/O converting unit 1115. The resetting unit 1111 applies a resetting signal to the control FPGA 1112. Upon receiving the resetting signal, the control FPGA 1112 resets the O/E converting unit 1113, the main signal terminating unit 1114, and the E/O converting unit 1115 by a controlling circuit 1112a. The control FPGA 1112 includes a programmable LSI and controls operations of the O/E converting unit 1113, the main signal terminating unit 1114, and the E/O converting unit 1115 in response to instructions from a controlling and monitoring unit 2000 that is connected to the transmission device 1100. For the control FPGA 1112, not only an FPGA but also an application specific integrated circuit (ASIC) that can be designed according to the use thereof may be employed.

The O/E converting unit 1113, the main signal terminating unit 1114, and the E/O converting unit 1115 are circuits for main signal transmission. A main signal is input into the transmission device 1100 from an external transmission path or another transmission device. The main signal is converted by the O/E converting unit 1113 from an optical signal into an electric signal, which is received by the main signal terminating unit 1114. The main signal terminating unit 1114 transmits the electric signal to the E/O converting unit 1115, which converts the electric signal into an optical signal and outputs the optical signal to an external transmission path or another transmission device.

FIG. 8 is a block diagram of a conventional transmission apparatus. The transmission apparatus includes the transmission device 1100 for an active line, and a transmission device 1200 identical to the transmission device 1100 for a standby line. Each transmission device is connected with the same controlling and monitoring unit 2000. At the startup of the transmission apparatus, the resetting units 1111 and 1211 send reset signals to other functional units 1112 to 1115 and 1212 to 1215, respectively. Upon receiving the reset signals, the control FPGAs 1112 and 1212 make settings in the main signal transmission circuits (1113 to 1115 and 1213 to 1215). After the settings, the transmission device 1100 for the active line starts the transmission of the main signal.

When the transmission is interrupted due to a fault occurred in the transmission device 1100 for the active line, the controlling and monitoring unit 2000 detects the interruption and switches the transmission device for the main signal to the transmission device 1200 for the standby line. After the switching, the main signal is transmitted by the transmission device 1200 for the standby line. Alternatively, the controlling and monitoring unit 200 may be provided externally, and may detect the fault and execute the resetting and the switching through a remote control (see, for example, Japanese Patent Application Laid-Open No. 1994-318107).

However, in the conventional technology, the main signal is transmitted only on the standby line after a fault has occurred in the active line. Therefore, if another fault occurs in the standby line, the transmission of the main signal is completely stopped (known as "deuteropathy").

Furthermore, when a fault occurs, a service person (such as a customer service staff member) has to come to the site where the transmission apparatus is installed. As a result, it takes long until the transmission device with the fault is replaced by the service person, thereby extending the time period during which only the standby line is available, and therefore easily leading to a network down because no redundant configuration can be employed.

Furthermore, if the transmission device with the fault includes a plurality of circuits 1113 to 1115 as the transmission device 1100 shown in FIG. 7, it also takes long to locate the point at which the fault has occurred, thereby hindering the prevention of the reoccurrence of the fault.

SUMMARY OF THE INVENTION

It is an object of the present invention to at least solve the problems of the conventional technology.

A transmission apparatus according to an aspect of the present invention includes: a plurality of signal transmission circuits on a transmission path; a monitoring unit that detects a fault by monitoring an operating status of each of the signal transmission circuits; a controlling unit that outputs a reset instruction when the monitoring unit detects the fault; and an individual resetting unit that receives the reset instruction and resets individually each of the signal transmission circuits.

A fault-recovery method according to another aspect of the present invention is a fault-recovery method for a transmission apparatus including a plurality of signal transmission circuits and a resetting unit connected to the signal transmission circuits. The fault-recovery method includes: monitoring an operating status of each of the signal transmission circuits; detecting a fault based on a result of the monitoring; outputting a reset instruction to the reset unit when the fault is detected at the detecting; and resetting individually each of the signal transmission circuits by the reset circuit.

The other objects, features, and advantages of the present invention are specifically set forth in or will become apparent

BRIEF DESCRIPTION OF THE DRAWINGS

FIG. 3A is a flowchart of a recovering process performed by the transmission apparatus;

FIG. 4 is a block diagram of a transmission apparatus according to a second embodiment of the present invention;

DETAILED DESCRIPTION OF THE PREFERRED EMBODIMENTS

Exemplary embodiments of the present invention will be described in detail with reference to the accompanying drawings.

Figure 1:
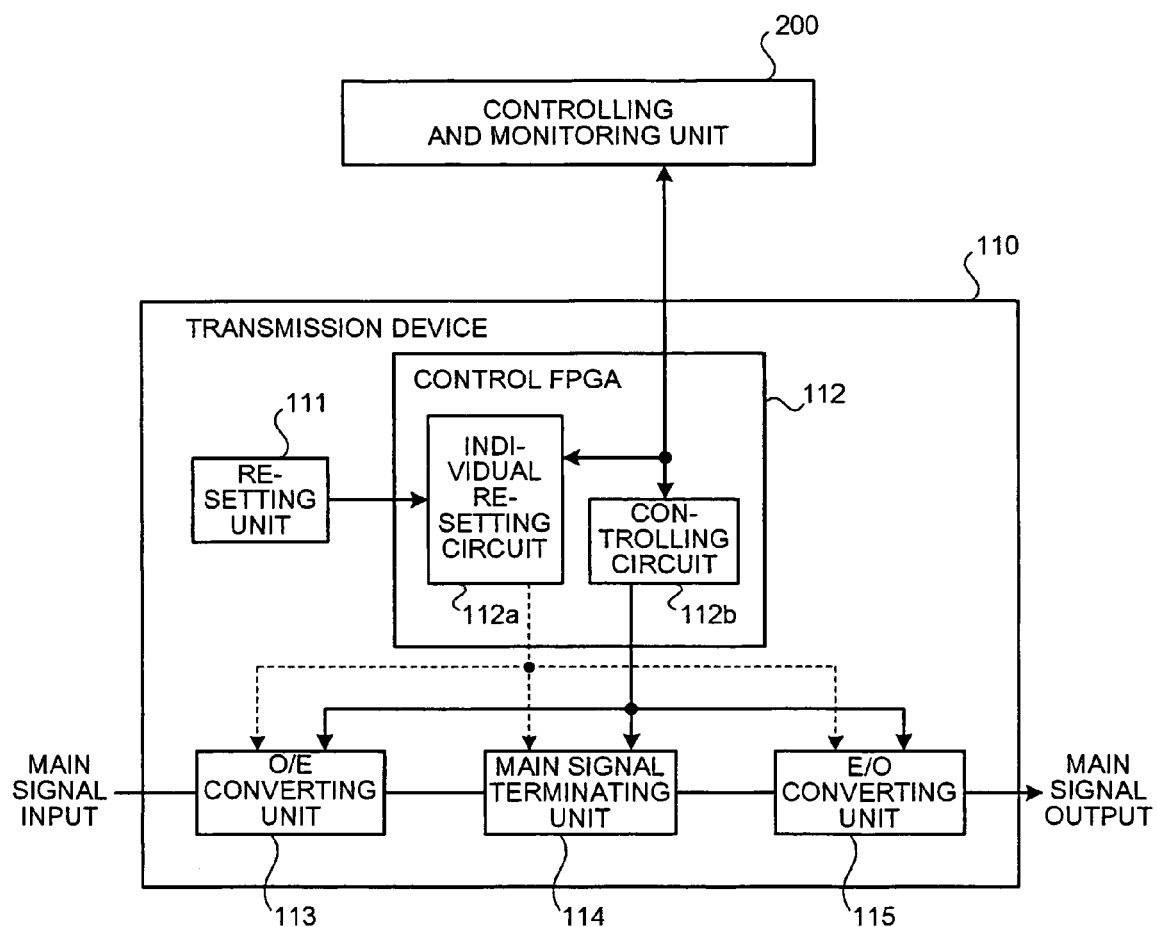
FIG. 1 is a block diagram of a transmission device and a controlling and monitoring unit according to a first embodiment of the present invention.

FIG. 1 is a block diagram of a transmission device and a controlling and monitoring unit according to a first embodiment of the present invention.

Figure 2:
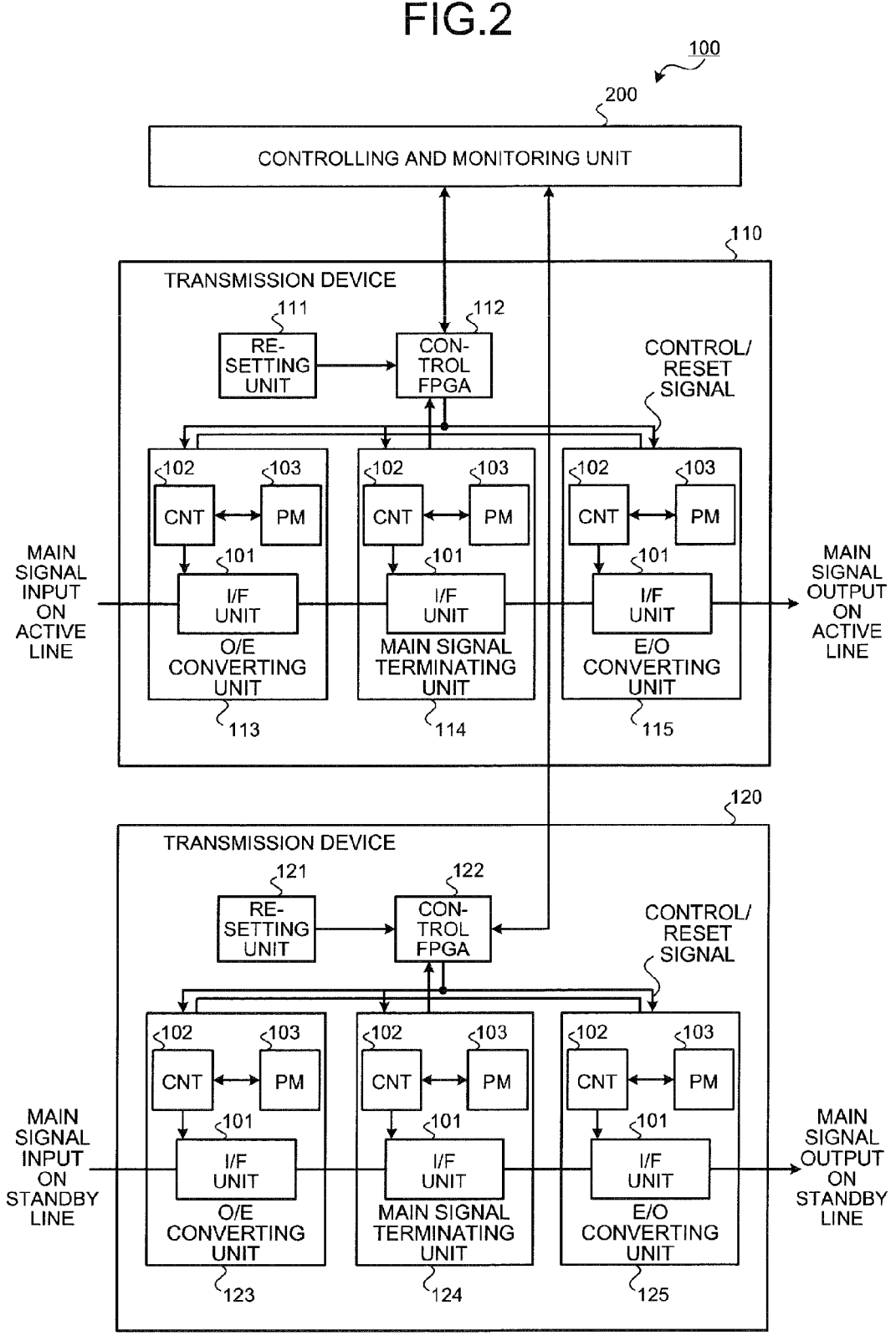
FIG. 2 is a block diagram of a transmission apparatus according to the first embodiment.

A transmission device 110 is one of a plurality of transmission devices constituting a transmission apparatus 100 according to the present invention shown in FIG. 2, each of which includes an individual resetting circuit that individually resets a plurality of circuits included therein. The transmission device 110 converts an optical signal input from a transmission path into an electric signal, and converts the electric signal into an optical signal output to the transmission path.

The transmission device 110 includes a resetting unit 111, a control FPGA 112, an O/E converting unit 113, a main signal terminating unit 114, and an E/O converting unit 115. The resetting unit 111 and the control FPGA 112 respectively act as an individual resetting unit. The O/E converting unit 113, the main signal terminating unit 114, and the E/O converting unit 115 respectively act as a signal transmission circuit.

The resetting unit 111 resets the control FPGA 112, the O/E converting unit 113, the main signal terminating unit 114, and the E/O converting unit 115 by applying a resetting signal.

The control FPGA 112 includes an individual resetting unit 112a and a controlling circuit 112b. When an instruction has been input from a controlling and monitoring unit 200 into the individual resetting unit 112a and the controlling circuit 112b, the operation of each of the circuits (the O/E converting unit 113, the main signal terminating unit 114, and the E/O converting unit 115) for transmitting the main signal is controlled following the instruction. The controlling and monitoring unit 200 acts as a monitoring unit and a controlling unit.

When a reset instruction is input from the resetting unit 111 to the individual resetting unit 112a, the unit 112a resets individually each of the circuits for transmitting the main signal. The operating status of each of the circuits after the resetting is monitored by the controlling and monitoring unit 200 for every resetting. For the control FPGA 112, not only an FPGA but also an ASIC that can be designed according to the use thereof may be employed.

A main signal is input into the transmission device 110 from an external transmission path or another transmission device. The main signal is converted by the O/E converting unit 113 from an optical signal into an electric signal, which is received by the main signal terminating unit 114. The main signal terminating unit 114 transmits the electric signal to the E/O converting unit 115, which converts the electric signal into an optical signal and outputs the optical signal to an external transmission path or another transmission device.

FIG. 2 is a block diagram of a transmission apparatus according to the first embodiment. As shown in FIG. 2, the transmission apparatus 100 has a redundant configuration in which transmission devices 110 and 120 having the same function are provided for an active line and a standby line, respectively. Thus, the main signal on the active line is input into the transmission device 110. The main signal on the standby line is input into the transmission device 120 after the transmission apparatus 100 switches from the active line to the standby line.

The detailed configuration of each of the circuits for transmitting the main signal (that is, the O/E converting units 113 and 123, the main signal terminating units 114 and 124, and the E/O converting units 115 and 125) of the transmission devices 110 and 120 will be described. Each of the above circuits 113 to 115 and 123 to 125 includes an interface (I/F) unit 101, a controlling (CNT) unit 102, and a performance monitor (PM) 103.

The I/F unit 101 receives the main signal from another circuit and applies a circuit-specific process to the main signal. The circuit-specific process is, for example, an optical/electrical conversion process for the O/E converting unit 113, and transmission/reception processes of the main signal for the main signal terminating unit 114. The main signal applied with the circuit-specific process is transmitted to another circuit. The CNT 102 controls the I/F unit 101 following an instruction input from the control FPGA 112.

The PM 103 monitors the operating status of each circuit. As a specific function of the PM 103, the PM 103 monitors the items such as signal interruptions, signal quality degradation (bit errors), etc. The result of the monitoring is output from the CNT 102 to the controlling and monitoring unit 200 through the control FPGA 112. When a fault has occurred, the controlling and monitoring unit 200 detects the fault by monitoring the result of the monitoring of the PM 103.

A process procedure for the normal operation of the transmission apparatus 100 having the configuration described above will be described. When the operation of the transmission apparatus 100 has been started, the power source voltage is monitored by the resetting unit 111 of the transmission device 110. When the power source voltage has been confirmed to be normal, a "RESET Pulse" signal is input from the resetting unit 111 into the control FPGA 112.

When receiving the RESET Pulse signal, the control FPGA 112 is initialized. After the initial setting, the control FPGA 112 for the active line outputs RESET Pulse signals respectively to the O/E converting unit 113, the main signal terminating unit 114, and the E/O converting unit 115 of the transmission device 110. Simultaneously, the control FPGA 122 for the standby line outputs RESET Pulse signals respectively to the O/E converting unit 123, the main signal terminating unit 124, and the E/O converting unit 125 of the transmission device 120.

When receiving the RESET Pulse signal, each of the circuits 113 to 115 and 123 to 125 starts initial settings thereof. After the initial settings, the transmission device 110 starts the normal operation thereof, while the transmission device 120 shifts into the stand-by state such that the line connected to the transmission device 120 can be switched as the active line immediately when a fault occurs in the active line. The initial setting of each of the circuits 113 to 115 and 123 to 125 is executed based on a setting stored in an incorporated memory (not shown) or an instruction from the controlling and monitoring unit 200.

FIG. 3A is a flowchart of a recovering process performed by the transmission device 110 of the transmission apparatus 100 according to the first embodiment, after the transmission apparatus 100 is started according to the procedure described above. First, it is judged whether any fault has been detected (step S301).

When a fault has been detected (step S301: Yes), a resetting process for the transmission device 110 is executed (step S302). The resetting process is an individual resetting process executed by instructing resetting to the individual resetting unit 112*a* of the transmission device 110 from the controlling and monitoring unit 200. By executing the resetting process, whether the transmission device 110 is in an operable state or an operation-stopped state is judged. The detailed procedure of the resetting process will be described later with reference to FIG. 3B.

After the resetting process at step S302, it is judged whether the transmission device 110 is operable (step S303). When the transmission device 110 is judged to be operable (step S303: Yes) (in other words, when the transmission device 110 has recovered from the fault by the resetting process at step S302), it is further judged whether a setting and/or a control can be executed to the transmission device 110 (step S304). On the other hand, when the transmission device 110 is judged to be non-operable (step S303: No), the active line is switched from the line connected to the transmission device 110 to the line connected to the transmission device 120 (step S309).

On the other hand, when the setting and/or the controlling are judged to be impossible (step S304: No), the resetting process is executed because any fault may have occurred in the transmission device 110 (step S305). After the resetting, it is judged whether the transmission device 110 is operable (step S306).

When the transmission device 110 is judged to be operable (step S306: Yes), the line connected to the transmission device 110 is set as the active line (step S307). When the transmission device 110 is judged to be non-operable (step S306: No), the active line is switched to the line connected to the transmission device 110 (step S309).

After the process at step S307, it is continuously monitored whether any fault has occurred in the transmission device 110 operating on the active line (step S308). When no fault has been detected (step S308: No), this indicates that the transmission device 110 is operating normally.

When a fault has been detected (step S308: Yes), switching between the active line and the standby line is executed (step S309), and it is judged whether the transmission device 120 is operable based on information input from the transmission device 120 to the controlling and monitoring unit 200 (step S310).

When the transmission device 120 has been judged to be operable (step S310: Yes), for operating the line connected to the transmission device 120 as the active line, the transmission device 120 executes the resetting process (step S311) and it is further judged whether the transmission device 120 is operable (step S312).

When the transmission device 120 is judged to be operable (step S312: Yes), the procedure is returned to step S308 and the transmission device 120 is operated on the active line. When faults have occurred in the active line, re-switching to the standby line is executed.

When the transmission device 120 has been judged to be non-operable (step S310: No), both of the transmission devices 110 and 120 are non-operable. In such a case, the current state is maintained, that is, both of the active line and the standby line keep the operation thereof interrupted and stay in the standby state (step S313), and the series of recovering process steps are ended. Similarly, when the transmission device 120 after resetting process is judged to be non-operable (step S312: No), the current state is kept (step S313), and the series of recovering process steps are ended without retaining any backup line.

Figure 3B:
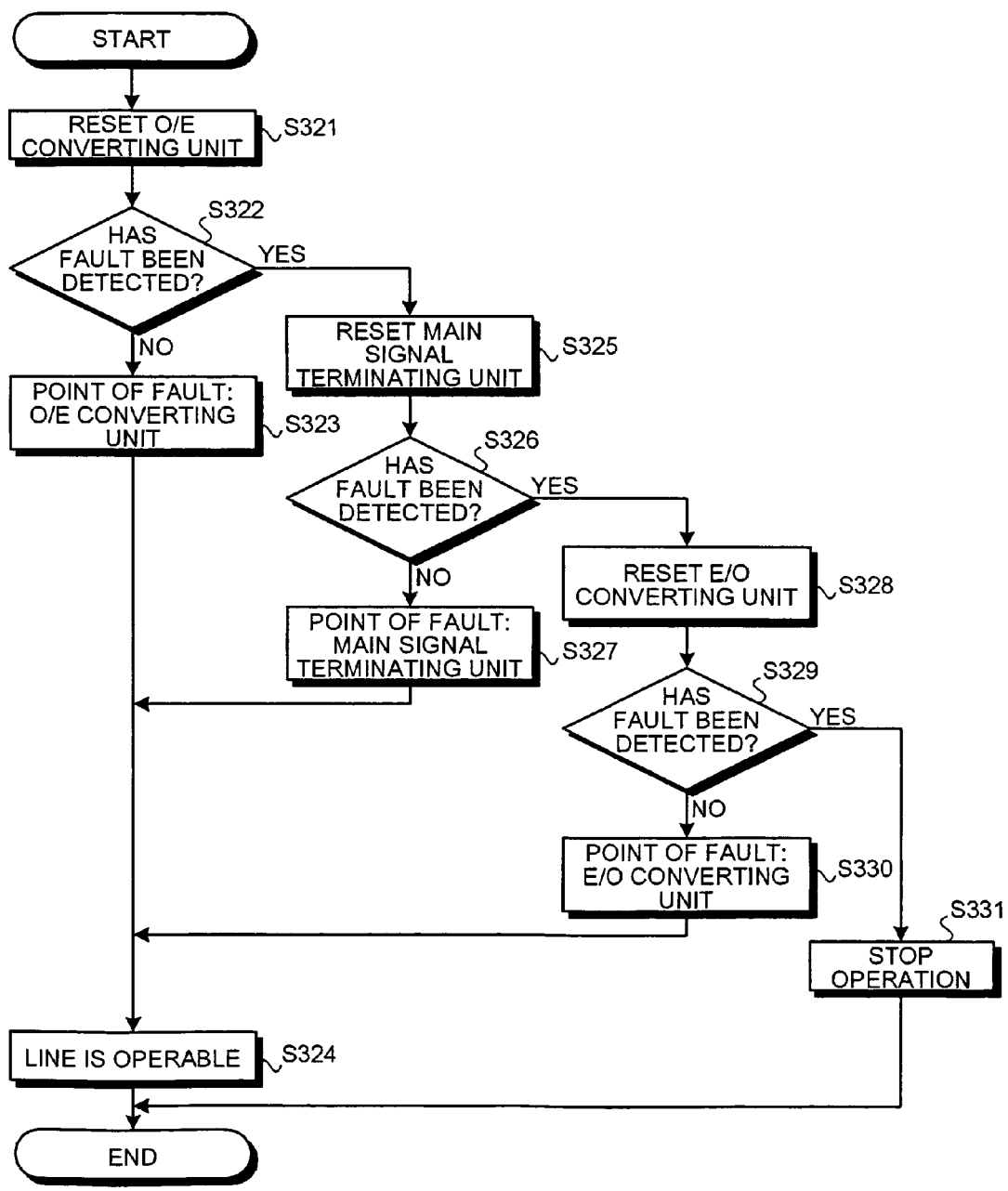
FIG. 3B is a flowchart of a resetting process performed by the transmission apparatus.

FIG. 3B is a flowchart of the resetting process according to the first embodiment of the present invention. After a resetting of the O/E converting unit 113 (step S321), it is judged whether the controlling and monitoring unit 200 remains to detect the fault (step S322).

When the controlling and monitoring unit 200 has detected no fault (step S322: No), the O/E converting unit 113 is judged to be the point of the fault (step S323), and the apparatus is judged to be operable (step S324). The series of the process steps are ended.

When the controlling and monitoring unit 200 remains to detect the fault (step S322: Yes), the main signal terminating unit 114 is reset (step S325). After resetting at step S325, similarly to step S322, it is judged whether the controlling and monitoring unit 200 remains to detect the fault (step S326).

When the controlling and monitoring unit 200 has not detected any fault (step S326: No), the main signal terminating unit 114 is judged to be the point of the fault (step S327), and the apparatus is judged to be operable (step S324). The series of the process steps are ended. When the controlling and monitoring unit 200 remains to detect the fault (step S326: Yes), the E/O converting unit 115 is reset (step S328).

After resetting at step S328, similarly to steps S322 and S326, it is judged whether the controlling and monitoring unit 200 remains to detect the fault (step S329). When the controlling and monitoring unit 200 has detected no fault (step S329: No), the E/O converting unit 115 is judged to be the point of the fault (step S330), and the apparatus is judged to be operable (step S324). The series of the process steps are ended.

When the controlling and monitoring unit 200 remains to detect the fault (step S329: Yes), the operation of the apparatus is judged to be interrupted (step S331), and the series of the process steps are ended.

According to the first embodiment described above, when the cause of the occurrence of a fault is attributable to unstableness of the operation in terms of units in each configuration in the transmission apparatus 100 (for example, latch-up, etc., caused by variation of the power source voltage, external noise, etc.), or when the cause is attributable to unstableness of frames of the main signal transmitted (for example, interruption of a signal, etc., caused by increase of the transmission capacity, bugs, etc.), the fault can be securely recovered by executing the resetting process.

For example, in the recovering work, when "RESET" is applied to the O/E converting unit 113 and no problem is present in the result of the monitoring of the PM 103 on the E/O converting unit 115 by the PM 103, bracketing investigation such as specifying that the o/E converting unit 113 is the cause, is possible and the investigation of the fault executed later can be promptly completed.

After switching to the standby line, by recovering more promptly the transmission device 110 for the active line with a fault by the individual resetting, the worst state where the main signal is interrupted when a fault has occurred also on the standby line side can be avoided. Therefore, the fault can be more promptly coped with than a service staff member arrives at the site of the fault as in a conventional case.

FIG. 4 is a block diagram of a transmission apparatus according to a second embodiment of the present invention. A transmission apparatus 300 according to the second embodiment has the same configuration as that of the transmission apparatus 100 according to the first embodiment, except for including the testing unit 400 to grasp the detailed contents of the fault. Therefore, the same reference numerals as those of the first embodiment (see FIG. 1) are given to and the description is omitted for the configuration except the testing unit 400.

The testing unit 400 includes an error detecting unit (ERROR DET) 410, a judging unit (JUDGE) 420, and a pulse pattern generator (PPG) 430. The error detecting unit 410 detects whether each of the circuits 113 to 115 and 123 to 125 operates normally when being input with a signal pattern, which has a same pattern as that of the main signal, from the PPG 430. The result of the detection by the error detecting unit 410 is input into the judging unit 420. The judging unit 420 judges whether the transmission devices 110 and 120 are operating normally based on the detection result from the error detecting unit 410. The judgment result by the judging unit 420 is input into the controlling and monitoring unit 200. The PPG 430 creates a signal pattern that is similar to the main signal. The created signal pattern is input into the error detecting unit 410 after actually transmitting through the transmission devices 110 and 120 similarly to the main signal.

A recovering process according to the second embodiment is the same as that of the first embodiment shown in FIG. 3A, except that the resetting process includes a self-diagnosis performed by the testing unit 400. Therefore, the description of the recovering process according to the second embodiment is omitted, and the procedure of the resetting process will be described below with reference to FIG. 5.

Figure 5:
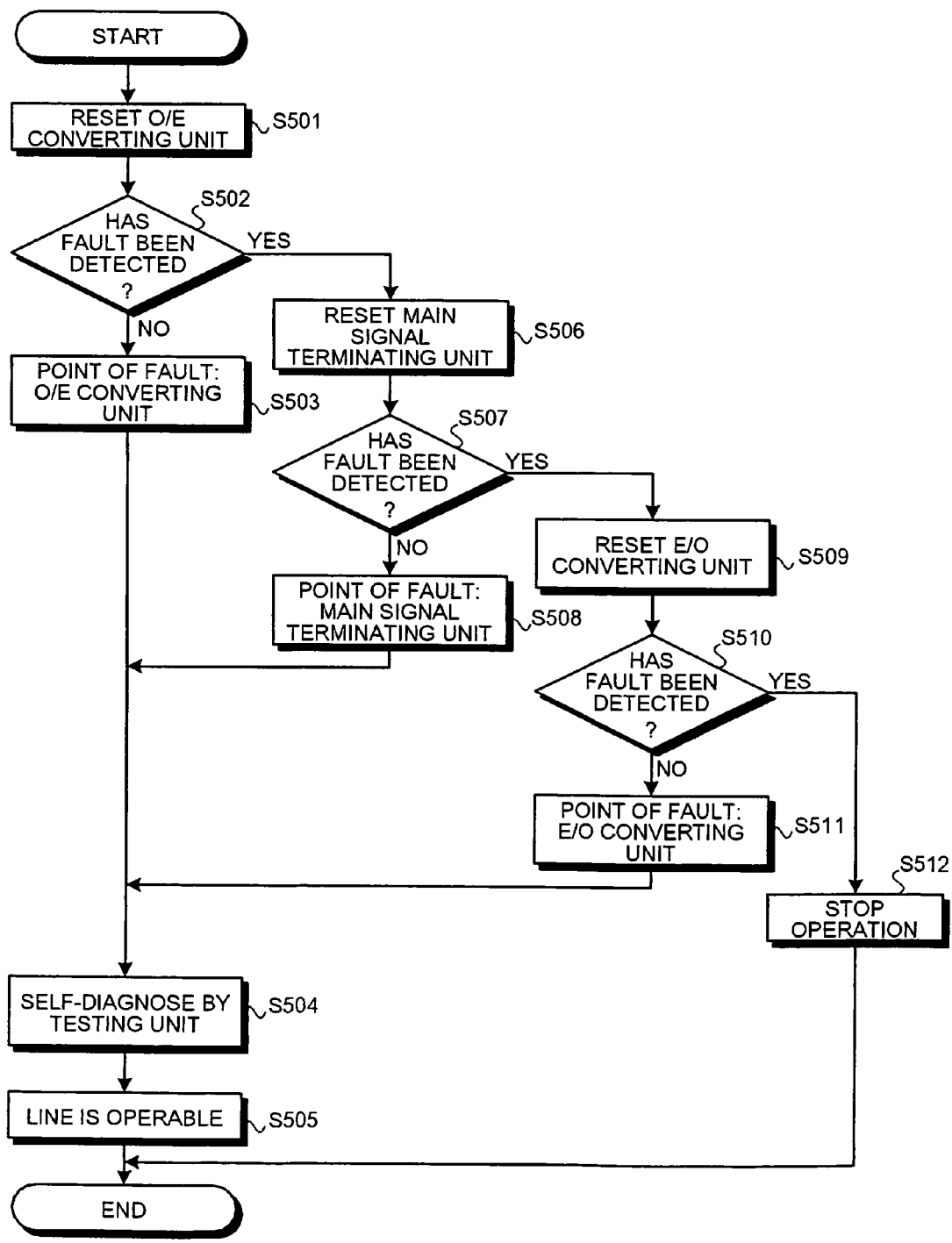
FIG. 5 is a flowchart of a resetting process performed by the transmission apparatus.

FIG. 5 is a flowchart of the resetting process according to the second embodiment. In the flowchart of FIG. 5, the O/E converting unit 113 is reset (step S501). After resetting at step S501, whether or not the controlling and monitoring unit 200 has consecutively detected a fault is judged (step S502).

When the controlling and monitoring unit 200 has not detected any fault at step S502 (step S502: No), the O/E converting unit 113 is judged to be the point of the fault (step S503), and self-diagnosis to the contents of a negotiation is executed by the testing unit 400 (step S504). The apparatus is judged to be operable (step S505) and the series of process steps are ended.

The self-diagnosis by the testing unit 400 will be described. The testing unit 400 acts as a testing unit that tests the main signal transmitted through the circuits (113 to 115) for transmitting the main signal. The PPG 430 acts as a creating unit that creates a test signal having the same waveform as that of the main signal and inputs the test signal into the circuits (113 to 115) for transmitting the main signal. The error detecting unit 410 acts as a detecting unit that detects the operations of the circuits (113 to 115) for transmitting the main signal that has been input with the test signal created by the PPG 430. The judging unit 420 acts as a judging unit that judges whether or not the circuits (113 to 115) operate normally with the test signal, based on the operation detected by the error detecting unit 410. The self-diagnosis is executed following such series of process steps as described above.

When another fault has been consecutively detected at step S502 (step S502: Yes), the main signal terminating unit 114 is reset (step S506). After resetting at step S506, similarly to step S502, whether or not the controlling and monitoring unit 200 has consecutively detected any fault is judged (step S507).

When the controlling and monitoring unit 200 has detected no fault at step S507 (step S507: No), the main signal terminating unit 114 is judged to be the point of the fault (step S508), and self-diagnosis is executed on the contents of the negotiation by the testing unit 400 (step S504). The apparatus is judged to be operable (step S505), and the series of the process steps are ended.

When another fault has been consecutively detected at step S507 (step S507: Yes), the E/O converting unit 115 is reset (step S509). After the resetting at step S509, similarly to steps S502, S507, whether or not the controlling and monitoring unit 200 has consecutively detected any fault is judged (step S510). When the controlling and monitoring unit 200 has detected no fault at step S510 (step S510: No), the E/O converting unit 115 is judged to be the point of the fault (step S511), and self-diagnosis on the contents of the negotiation is executed by the testing unit 400 (step S504). The apparatus is judged to be operable (step S505), and the series of the process steps are ended.

When a fault has been detected at step S510 (step S510: Yes), the operation of the apparatus is judged to be interrupted (step S512), and the series of the process steps are ended.

As described above, according to the second embodiment, similarly to the first embodiment, when the cause of the occurrence of a fault is attributable to unstableness of the operation in terms of units in each configuration in the transmission apparatus 100, or when the cause is attributable to unstableness of frames of the main signal transmitted, the fault can be securely recovered by executing the resetting process and, simultaneously, a prompt fault investigation and quick recovery are possible.

Because the apparatus is provided with the testing unit 400 in the second embodiment, detailed evaluation is possible for each of the transmission devices 110, 120 that are regarded to have been recovered by the individual resetting. More specifically, various types of test pattern signals are input from the PPG 430 and the test pattern signals having passed through the transmission devices 110, 120 are received by the error detecting unit 410. When the test pattern signals operate successfully, the result is transmitted directly from the judging unit 420 to the controlling and monitoring unit 200. The PM 103 of each circuit is monitored and a comprehensive check can be executed on the controlling and monitoring unit 200 side.

That is, in the second embodiment, by adding the testing unit 400, the contents of a fault of the configuration that is the cause of the fault can be detected in detail when the fault has occurred and the fault has been recovered by the individual resetting inside the transmission apparatus 100. Therefore, by evaluating the detected detailed contents of the fault, a measure suitable for the system that employs the transmission apparatus 100 according to the present invention, against the fault can be taken.

The controlling and monitoring unit 200 in the first embodiment and the second embodiment may have a configuration that has an access point such as a LAN (Local Area Network), DCC (Data Communication Channels), etc., such that remote controlling from a remote location is possible. When an access point is provided to the controlling and monitoring unit 200, in addition to the autonomous recovering process by the transmission apparatus 100 as described in the first embodiment and the second embodiment, and separately from the internal processes of the transmission apparatus 100, the individual resetting can be controlled for the case where resetting is desired to be executed intentionally and individually in a check, etc. In case an error has occurred to the transmission apparatus 100 during a recovering process and the transmission apparatus 100 freezes or goes out of control, this state can be coped with.

Figure 6:
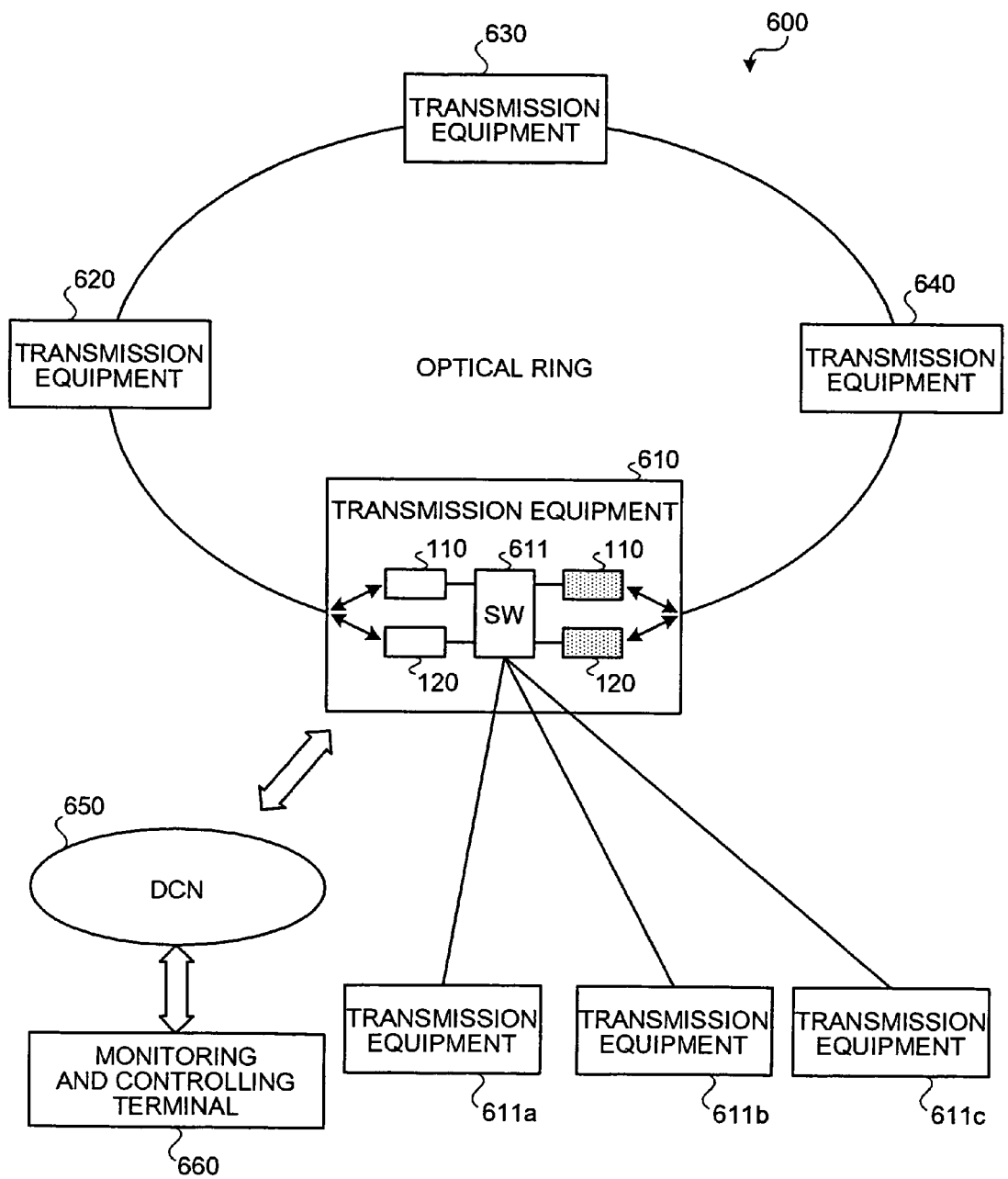
FIG. 6 is an explanatory view of a transmission system deploying the transmission apparatus according to the present invention.
Figure 7:
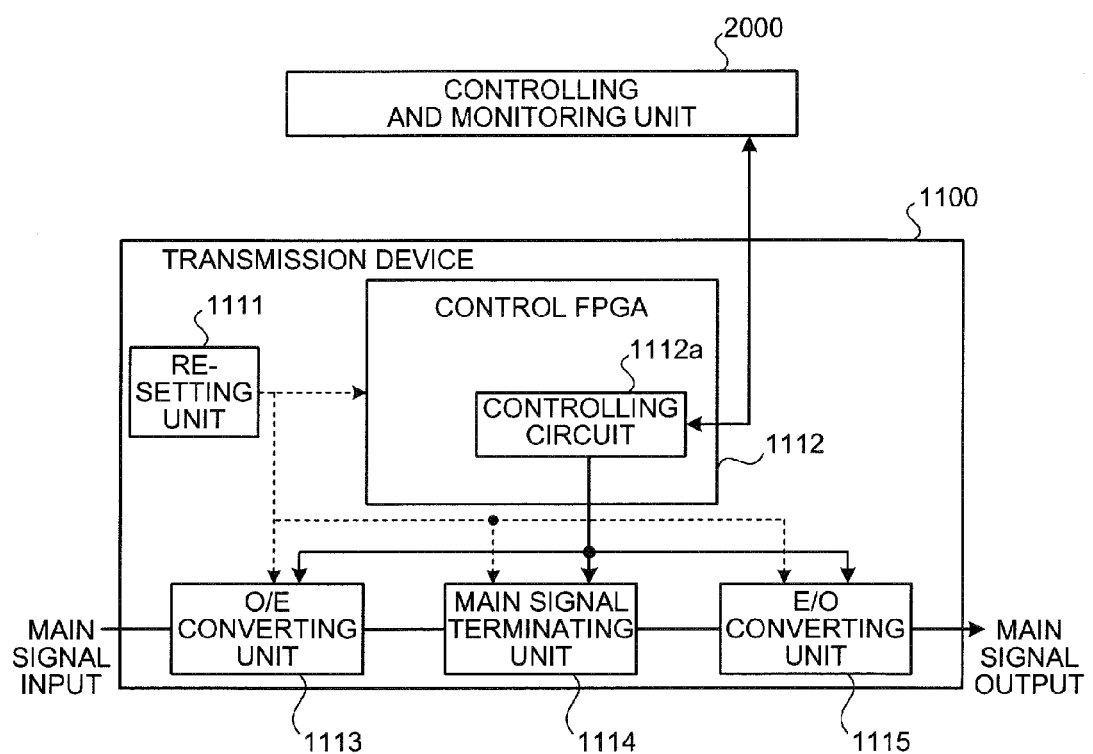
FIG. 7 is a block diagram of a conventional transmission device and a conventional controlling and monitoring unit.
Figure 8:
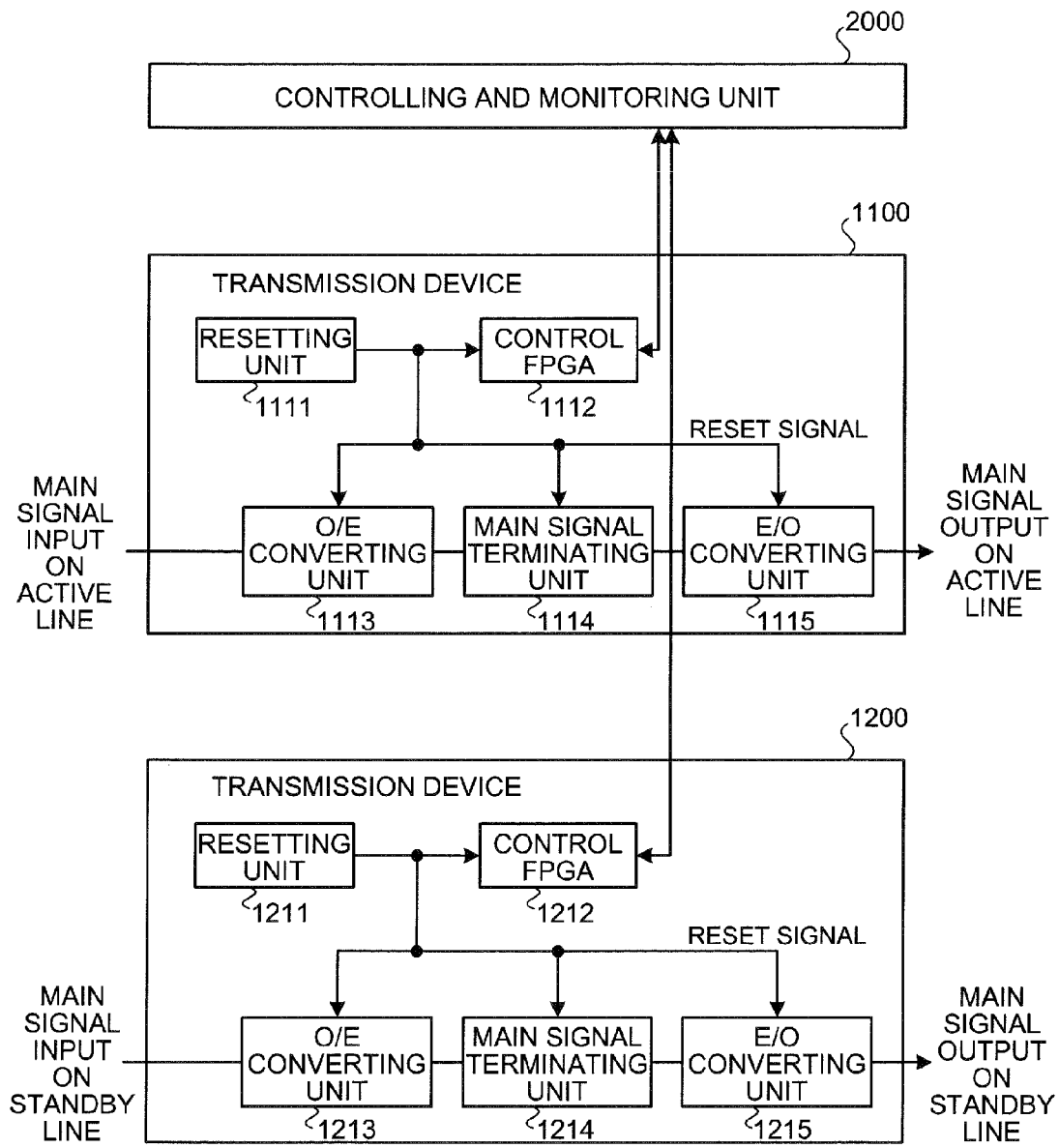
FIG. 8 is a block diagram of a conventional transmission apparatus.

FIG. 6 is an explanatory view of a transmission system employing the transmission apparatus according to the present invention. A transmission system 600 has an optical ring configuration that connects transmission equipments 610 to 640 according to the present invention. Each of the transmission equipments 610 to 640 has a redundant configuration including the transmission device 110 for the active line and the transmission device 120 for the standby line, as shown with the transmission equipment 610.

Transmission equipments 611a to 611c may be newly added by including a switching unit (SW) 611 inside the transmission equipment 610. The transmission equipment 610 may be connected with a data communication network (DCN) 650. When the transmission equipment 610 is connected with the DCN 650, a monitoring and controlling terminal 660 used for remote-controlling through the DCN 650 may be connected. As the main signal to be transmitted using the transmission system 600, specifically, an optical signal conforming with a standard such as Ethernet™/SDH (Synchronous Digital Hierarchy), etc.

Though the transmission apparatuses including the redundant configuration consisting of the active line and the standby line have been described in the above the first embodiment and the second embodiment, the configuration and the recovering method are effective even in a transmission apparatus without any redundant function. Recently, a more prompt recovering process that copes with a fault is sought when the fault has occurred to a transmission apparatus. The measures for the process contribute to the quality guidelines for transmission apparatuses. Therefore, the measures are widely required by venders. For a transmission apparatus without any redundant configuration, more prompt recovery of the line thereof is enabled compared to a conventional transmission apparatus by including therein a configuration as shown in FIG. 1 and executing resetting control for each of the circuits thereof individually.

According to the present invention, because resetting control can be executed on each circuit individually, a fault can be recovered as soon as possible and the point at which the fault has occurred can be easily located when the fault has occurred.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A transmission apparatus comprising
   a plurality of signal transmission circuits on a transmission path;
   a monitoring unit that detects a fault by monitoring an operating status of each of the signal transmission circuits;
   a controlling unit that outputs a reset instruction when the monitoring unit detects the fault; and
   a resetting unit that receives the reset instruction and resets the signal transmission circuits sequentially, wherein
   the monitoring unit determines whether the fault is detected every time the resetting unit resets one of the signal transmission circuits, and
   the resetting unit stops resetting the signal transmission circuits when no fault is detected, and otherwise continues to reset the signal transmission circuits sequentially.

2. The transmission apparatus according to claim 1, wherein
   each of the signal transmission circuits includes at least a first signal transmission circuit and a second signal transmission circuit that is located downstream of the first signal transmission circuit on the transmission path, and
   the resetting unit resets the second signal transmission circuit after resetting the first signal transmission circuit.

3. The transmission apparatus according to claim 1, further comprising a testing unit that tests each of the signal transmission circuits by passing a test signal through the signal transmission circuits, wherein
   the monitoring unit locates a point of the fault based on a test performed by the testing unit.

4. The transmission apparatus according to claim 3, wherein the testing unit includes:
   a creating unit that creates the test signal having the same waveform as that of a signal transmitted on the transmission path;
   a detecting unit that detects a operation of each of the signal transmission circuits input with the test signal; and
   a judging unit that judges whether each of the signal transmission circuits operates normally with the test signal, based on the operation detected by the detecting unit.

5. The transmission apparatus according to claim 1, wherein
   the transmission apparatus includes
   a first set of the signal transmission circuits on a first line used as an active line; and
   a second set of a plurality of signal transmission circuits on a second line, and
   the monitoring unit sets the second line as the active line when the transmission apparatus does not become operable after a resetting performed by the resetting unit.

6. The transmission apparatus according to claim 1, wherein the monitoring unit and the controlling unit are controlled by a remote controlling unit that is connected thereto over a network.

7. A fault-recovery method for a transmission apparatus including a plurality of signal transmission circuits and a resetting unit connected to the signal transmission circuits, comprising:
   monitoring an operating status of each of the signal transmission circuits;
   detecting a fault based on a result of the monitoring;
   outputting a reset instruction to the reset unit when the fault is detected at the detecting;
   resetting the signal transmission circuits sequentially by the resetting unit;
   determining whether the fault is detected every time the resetting unit resets one of the signal transmission circuits; and
   stopping the resetting when no fault is detected, and otherwise continuing the resetting.

* * * * *